(12) United States Patent
Porter et al.

(10) Patent No.: US 11,385,469 B2
(45) Date of Patent: Jul. 12, 2022

(54) HEAD-MOUNTED DISPLAY WITH PIVOTING DISPLAY

(71) Applicant: Vuzix Corporation, West Henrietta, NY (US)

(72) Inventors: Tyler W. Porter, Honeoye Falls, NY (US); Russell D. Page, Palmyra, NY (US); Paul J. Travers, Honeoye Falls, NY (US); Robert J. Schultz, Victor, NY (US)

(73) Assignee: Vuzix Corporation, West Henrietta, NY (US)

( * ) Notice: Subject to any disclaimer, the term of this patent is extended or adjusted under 35 U.S.C. 154(b) by 215 days.

(21) Appl. No.: 16/068,079

(22) PCT Filed: Jan. 5, 2017

(86) PCT No.: PCT/US2017/012356
§ 371 (c)(1),
(2) Date: Jul. 3, 2018

(87) PCT Pub. No.: WO2017/120353
PCT Pub. Date: Jul. 13, 2017

(65) Prior Publication Data
US 2020/0278555 A1 Sep. 3, 2020

Related U.S. Application Data

(60) Provisional application No. 62/275,561, filed on Jan. 6, 2016.

(51) Int. Cl.
*G02B 27/01* (2006.01)
(52) U.S. Cl.
CPC .. *G02B 27/0176* (2013.01); *G02B 2027/0159* (2013.01); *G02B 2027/0178* (2013.01)

(58) Field of Classification Search
CPC .............. G02B 27/0176; G02B 27/178; G02B 27/016; G02B 2027/0178; G02B 2027/0159
See application file for complete search history.

(56) References Cited

U.S. PATENT DOCUMENTS

| 4,848,891 A | 7/1989 | Lee |
| 5,003,300 A | 3/1991 | Wells |

(Continued)

FOREIGN PATENT DOCUMENTS

| EP | 1202104 A1 | 5/2002 |
| JP | 2004078057 A | 3/2004 |

(Continued)

OTHER PUBLICATIONS

International Search Report for International Application No. PCT/US2017/012348 dated Mar. 23, 2017.

(Continued)

*Primary Examiner* — Ariel A Balaoing
(74) *Attorney, Agent, or Firm* — Harter Secrest & Emery LLP; Thomas B. Ryan; Jacob D. Merrill, Esq.

(57) ABSTRACT

A wearable display apparatus has a support that mounts the display apparatus against the head of a viewer; a ball joint that is fitted within the support and coupled to a clamp that extends from the support; a slide that is translatable within the clamp in a first direction and that holds a display module for forming the display image; and a display coupled to the display module and rotatable in a first arc about a vertical axis that extends in a second direction that is orthogonal to the first direction and further rotatable in a second arc about a horizontal axis that is substantially orthogonal to the vertical axis.

14 Claims, 13 Drawing Sheets

(56) References Cited

U.S. PATENT DOCUMENTS

| | | | |
|---|---|---|---|
| 5,581,806 A * | 12/1996 | Capdepuy | A42B 3/04 |
| | | | 2/6.2 |
| 5,666,181 A | 9/1997 | Conway | |
| 6,034,653 A | 3/2000 | Robertson et al. | |
| 6,680,802 B1 * | 1/2004 | Ichikawa | G02B 27/0172 |
| | | | 359/630 |
| 2005/0146488 A1 * | 7/2005 | Travers | G02B 27/0176 |
| | | | 345/8 |
| 2006/0119539 A1 * | 6/2006 | Kato | G02B 27/0176 |
| | | | 345/8 |
| 2006/0238878 A1 | 10/2006 | Miyake et al. | |
| 2008/0169998 A1 * | 7/2008 | Jacobsen | G02B 27/0172 |
| | | | 345/8 |
| 2010/0046070 A1 | 2/2010 | Mukawa | |
| 2011/0012814 A1 | 1/2011 | Tanaka | |
| 2012/0062998 A1 | 3/2012 | Schultz et al. | |
| 2012/0069448 A1 | 3/2012 | Sugihara et al. | |
| 2013/0051730 A1 | 2/2013 | Travers et al. | |
| 2014/0300966 A1 | 10/2014 | Travers et al. | |
| 2015/0138714 A1 | 5/2015 | Davis | |
| 2015/0309263 A2 | 10/2015 | Abovitz et al. | |
| 2016/0085077 A1 * | 3/2016 | Milea | G02B 27/0176 |
| | | | 359/632 |
| 2016/0103325 A1 * | 4/2016 | Mirza | H04N 5/2253 |
| | | | 348/335 |
| 2017/0090202 A1 * | 3/2017 | Tatsuta | G06F 3/011 |
| 2017/0168305 A1 * | 6/2017 | Kusuda | G02B 27/0176 |
| 2019/0113759 A1 * | 4/2019 | Tatsuta | G02B 27/0176 |

FOREIGN PATENT DOCUMENTS

| | | |
|---|---|---|
| JP | 3797962 B2 | 7/2006 |
| JP | 4023412 B2 | 12/2007 |
| JP | 2009033308 A | 2/2009 |
| JP | 2010091748 A | 4/2010 |
| JP | 2012063627 A | 3/2012 |
| JP | 2013239767 A | 11/2013 |

OTHER PUBLICATIONS

International Written Opinion for International Application No. PCT/US2017/012348 dated Mar. 23, 2017.
International Search Report for International Application No. PCT/US2017/012356 dated Mar. 16, 2017.
International Written Opinion for International Application No. PCT/US2017/012356 dated Mar. 16, 2017.
China National Intellectual Property Administration (CNIPA), First Office Action in Chinese Patent Application No. 201780005842.8, dated Mar. 18, 2020.
Japanese Patent Office, Notice of Reasons for Rejection in Japanese Patent Application No. 2018-533877, dated Aug. 27, 2019.
European Patent Office, Supplementary Extended European Search Report in European Application No. 17736348, dated Jul. 29, 2019.

* cited by examiner

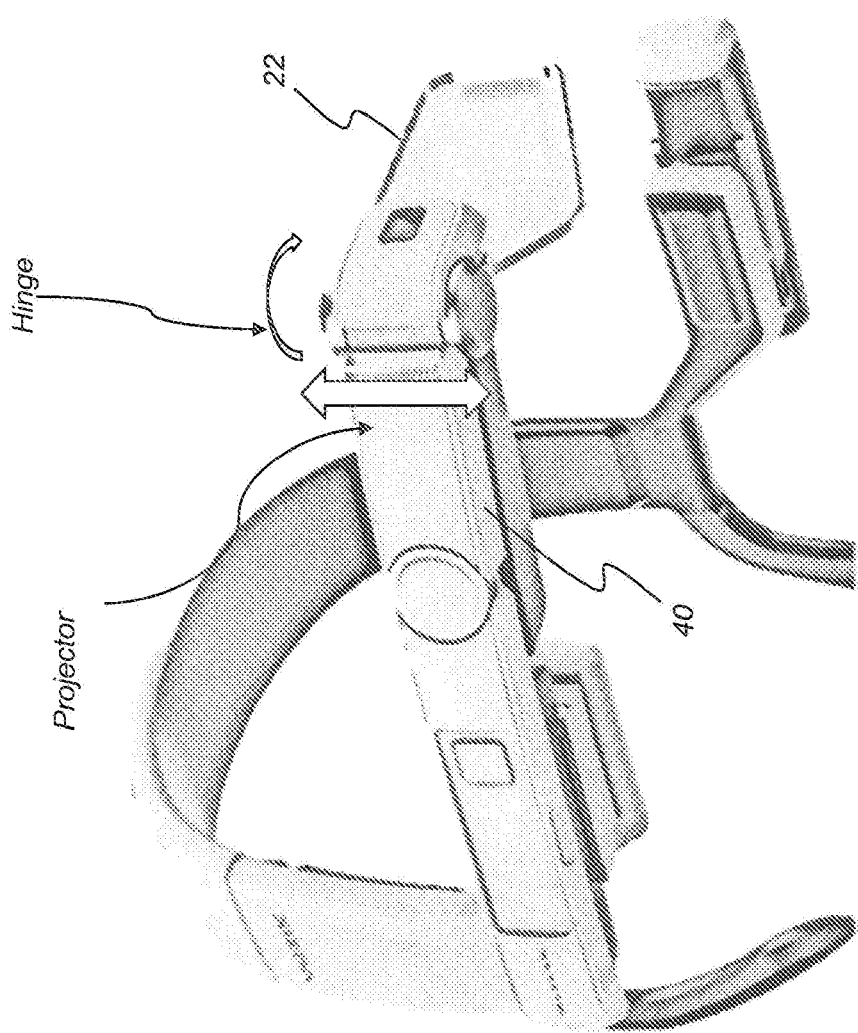

HEAD-MOUNTED DISPLAY WITH PIVOTING DISPLAY

TECHNICAL FIELD

This invention generally relates to electronic displays and more particularly relates to head-mounted (near-eye) displays that use imaging light guides to convey image-bearing light to a viewer.

BACKGROUND OF THE INVENTION

Head-Mounted Displays (HMDs), which include monocular and binocular near eye displays, are being developed for a range of diverse uses, including military, commercial, industrial, fire-fighting, and entertainment applications. In conventional HMDs, both immersive and transparent to the real world, virtual images are formed that must be positioned relative to a user's eye. Furthermore, there is a need to be able to position the virtual image so that it does not obstruct the user's field of view.

In order to form a virtual image at an intended position for a viewer, the optical apparatus must satisfy various geometric and positional requirements. These requirements often impact design and usability factors such as viewer position and placement of the optical system relative to the eye of the viewer. The optical system, for example, may not be able to position the virtual image at precisely the position at which it would be most useful for a particular viewer or purpose due to anatomical variations between viewers. The viewer may want the virtual image content available within the field of view, but may not want image content directly superimposed onto, and partially obscuring, real-world objects in the field of view. Or, in a partially occluded system, the viewer may want to position the virtual image in an upper portion of the field of view so that hands are visible in a lower portion. Rigid constraints typical of a number of previous HMD optics designs can make the HMD system awkward to use for practical functions.

Furthermore, proper positioning of an image has both lateral and angular aspects and these can be interrelated, so that an adjustment in one direction affects other adjustments. Simply repositioning an HMD higher on the viewer's head may not be sufficient for repositioning the image that is formed and may even cause the exiting rays from the HMD to miss the viewer's pupil entirely. Similarly, tilting an HMD without any lateral movement may make it impossible to view the virtual image.

Mechanical adjustments provided for existing HMD systems may allow a measure of adjustment, but are often awkward and difficult for the viewer to adjust without assistance.

Thus, it can be appreciated that there would be practical utility in methods and apparatus that provide some measure of flexibility in placement of optical components used for virtual imaging, allowing adjustment in placement of the virtual image itself. It would be advantageous to allow flexible placement with relation to the three orthogonal linear dimensions, as well as to the three angular dimensions, and to provide this capability within a compact form factor.

SUMMARY OF THE INVENTION

It is an object of the present disclosure to advance the art of image presentation within compact head-mounted (near-eye) displays. In addition, it would be advantageous to provide a design that allows the viewer to manually adjust the relative position of the virtual image content without removing the wearable display and without interrupting visibility of the virtual content display.

These and other aspects, objects, features and advantages of the present invention will be more clearly understood and appreciated from a review of the following detailed description of the preferred embodiments and appended claims, and by reference to the accompanying drawings.

According to an aspect of the present disclosure, there is provided an adjustable imaging apparatus including a support that mounts a display apparatus against the head of a viewer. A ball joint is fitted within the support and coupled to a clamp that extends from the support. A slide is translatable within the clamp in a first direction and holds a display module for forming the display image. A display coupled to the display module and rotatable in a first arc about a vertical axis extends in a second direction that is orthogonal to the first direction and further rotatable in a second arc about a horizontal axis that is substantially orthogonal to the vertical axis.

BRIEF DESCRIPTION OF THE DRAWING FIGURES

While the specification concludes with claims particularly pointing out and distinctly claiming the subject matter of the present invention, it is believed that the invention will be better understood from the following description when taken in conjunction with the accompanying drawings.

Figure 2A:
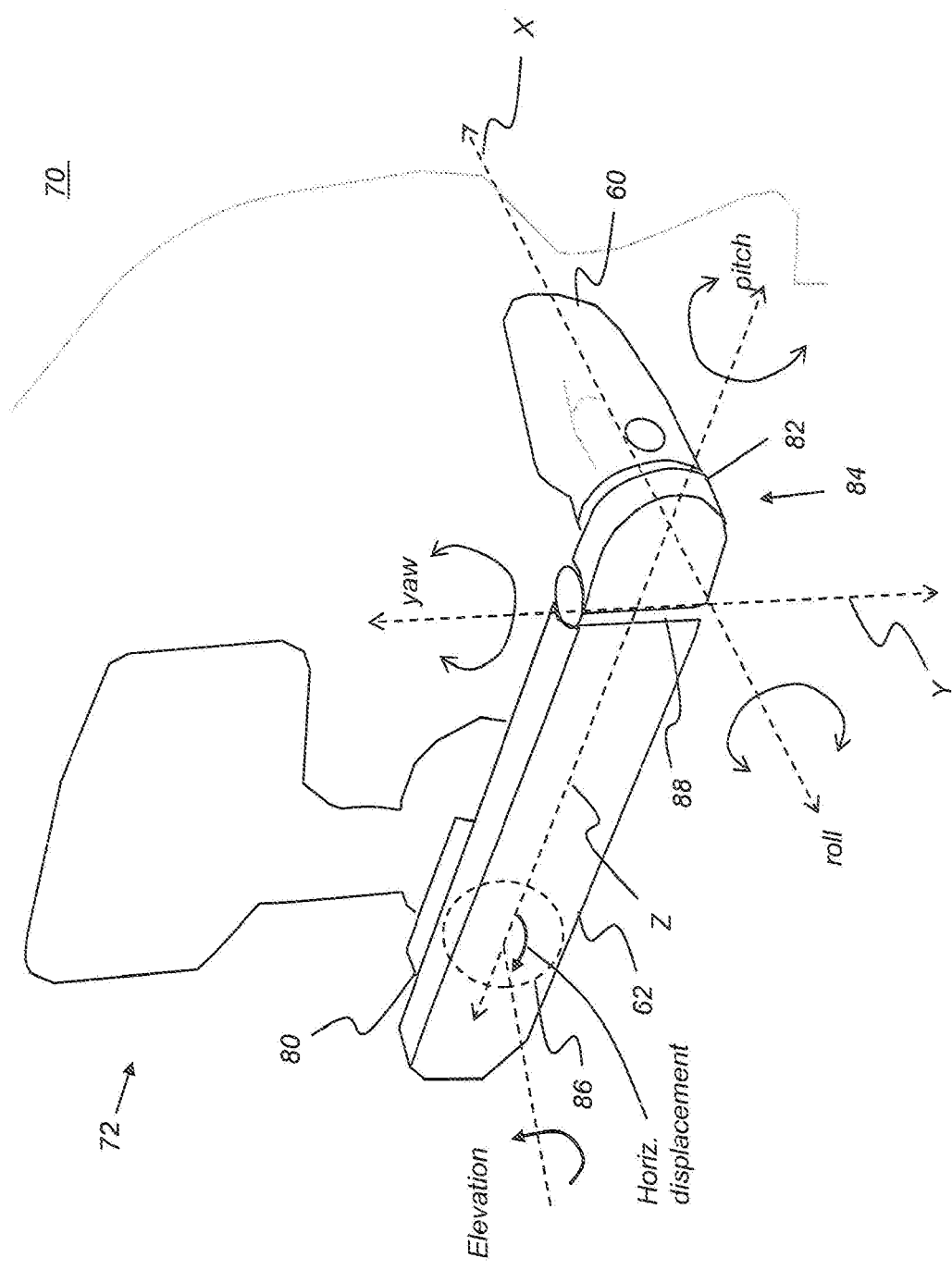
Figure 2B:
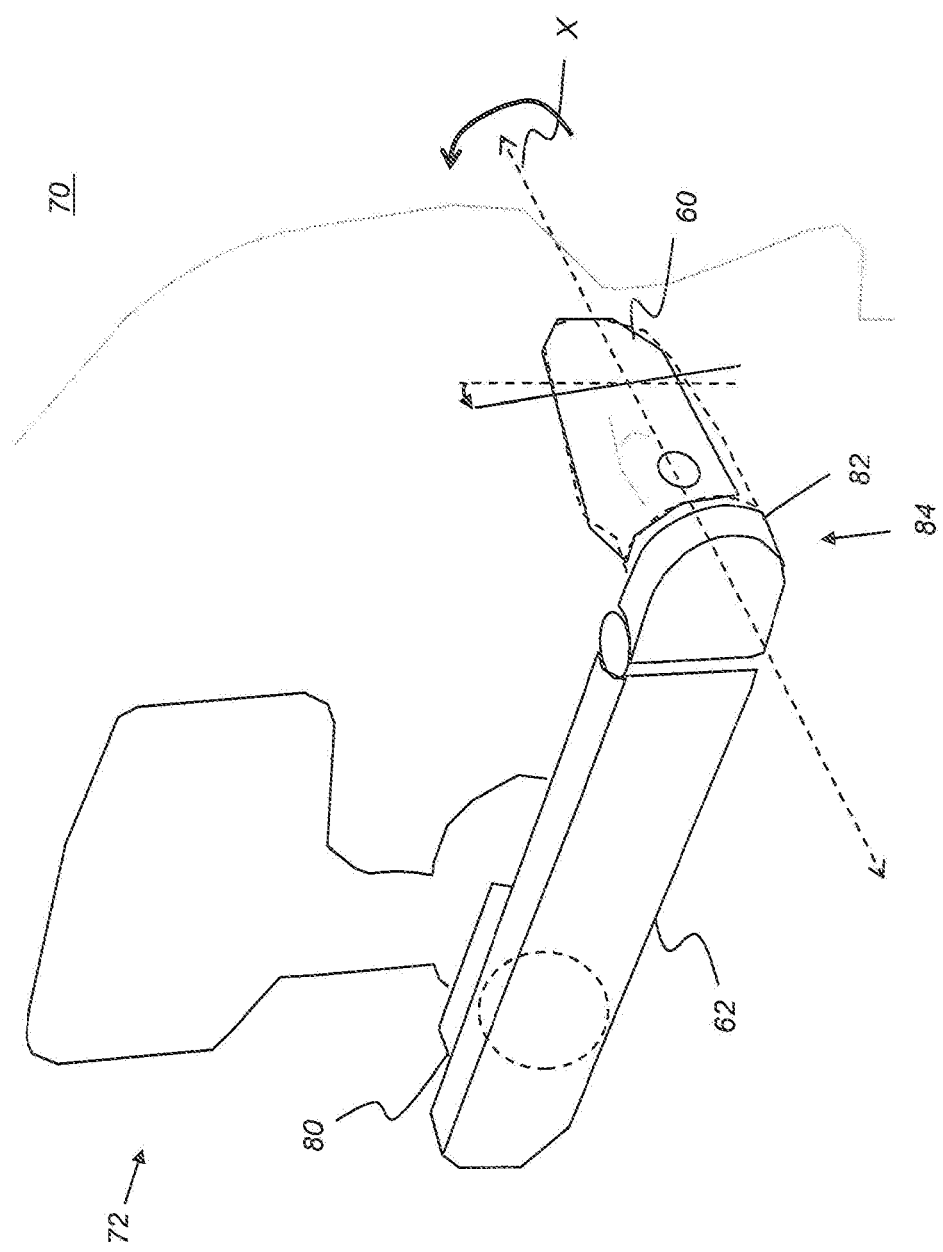
Figure 2C:
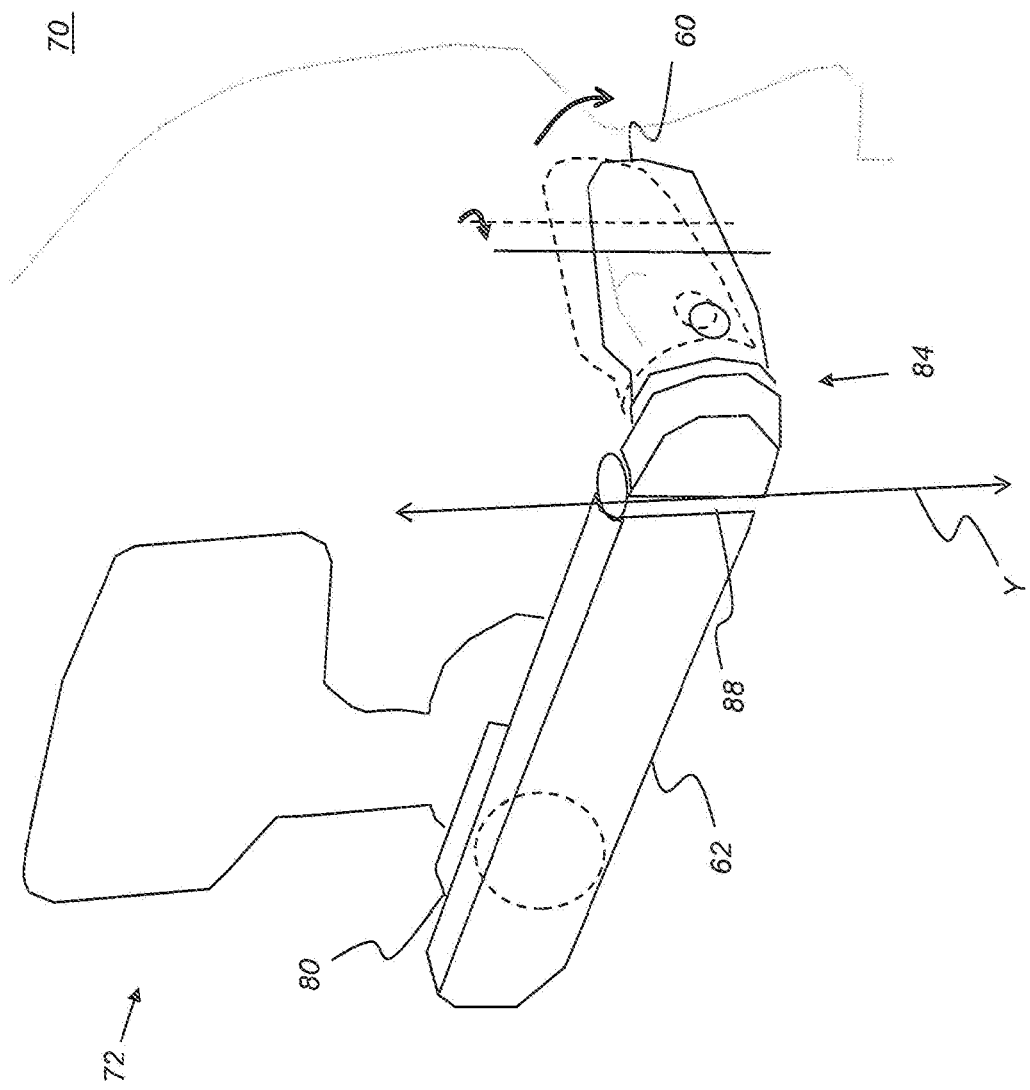

FIGS. 2A, 2B, and 2C are schematic views that show how the imaging apparatus can be adjusted for various positions of the imaging display, relative to mutually orthogonal X, Y, and Z coordinate axes.

Figure 2D:
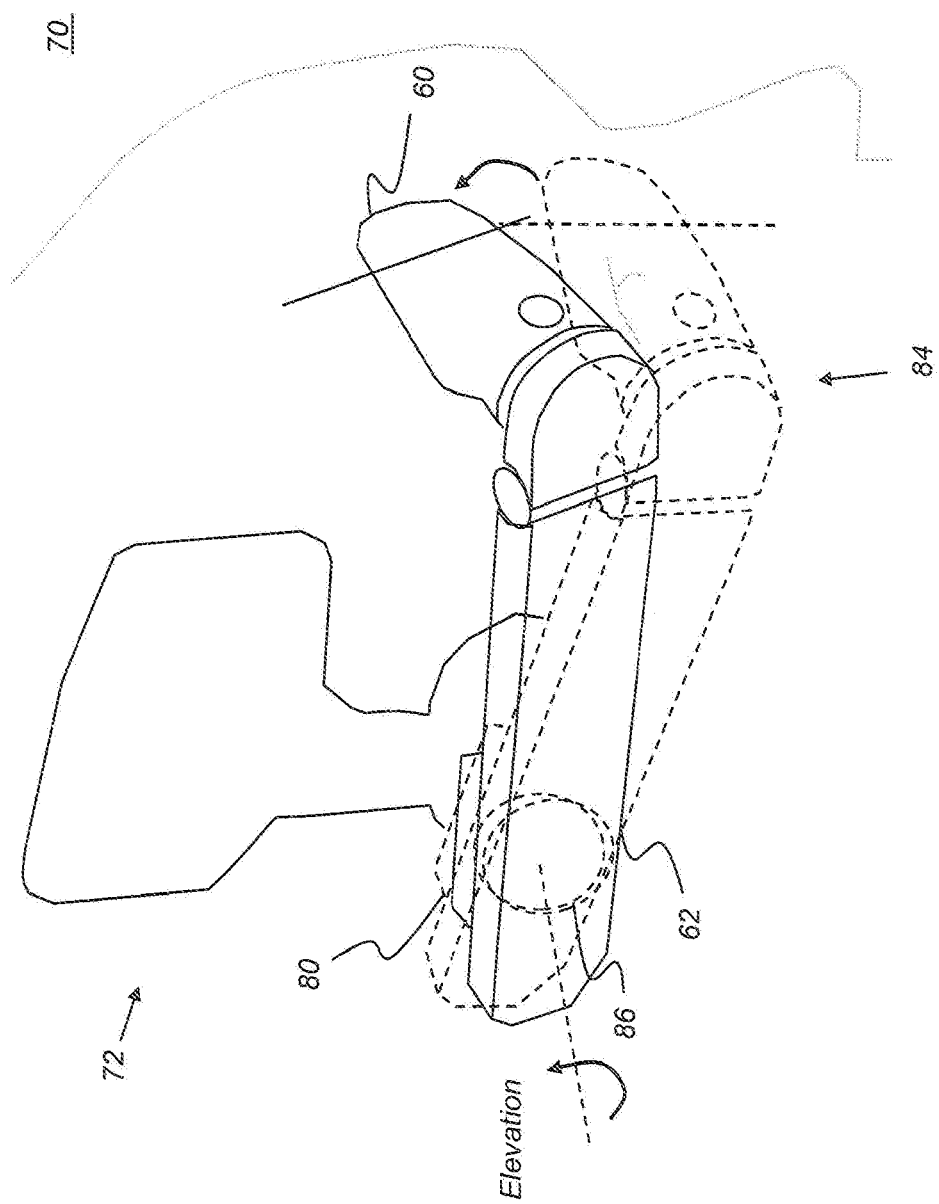

FIG. 2D shows an elevation adjustment for the imaging display by pivoting from a ball joint.

Figure 3:
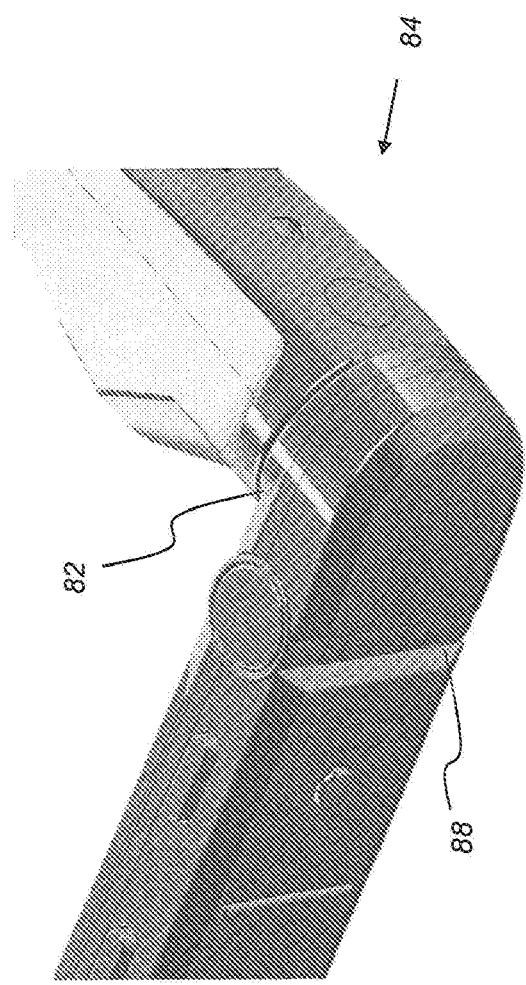

FIG. 3 is a perspective view that shows components of a display mount according to an embodiment.

Figure 4A:
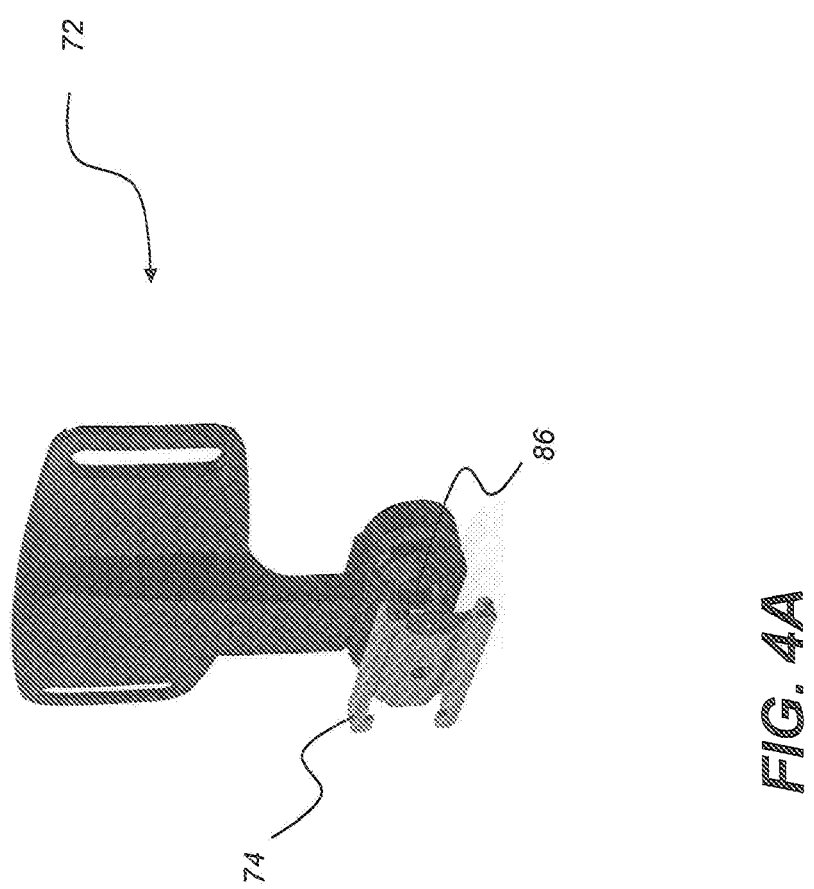

FIG. 4A is a perspective view showing a portion of the head mount for a display according to an embodiment.

Figure 4B:
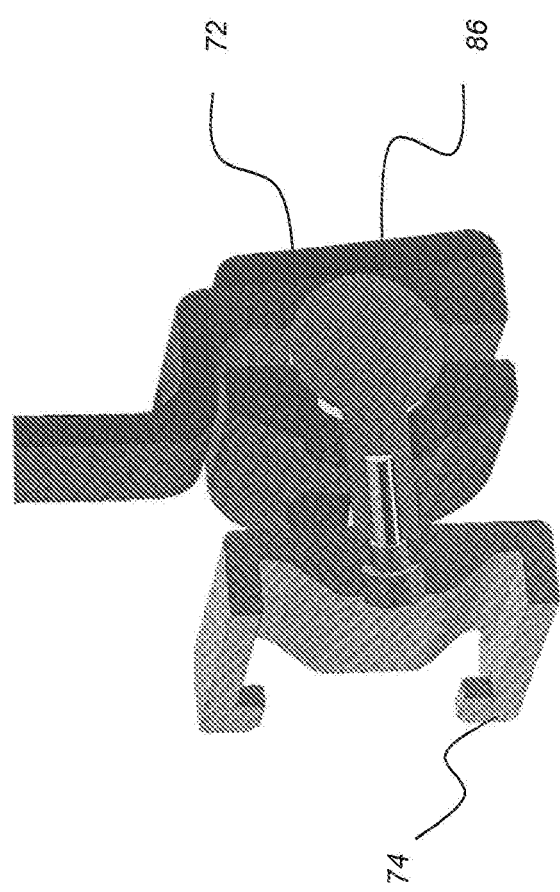

FIG. 4B is a close-up perspective view showing a clamp and a cross-section of a ball joint.

Figure 5B:
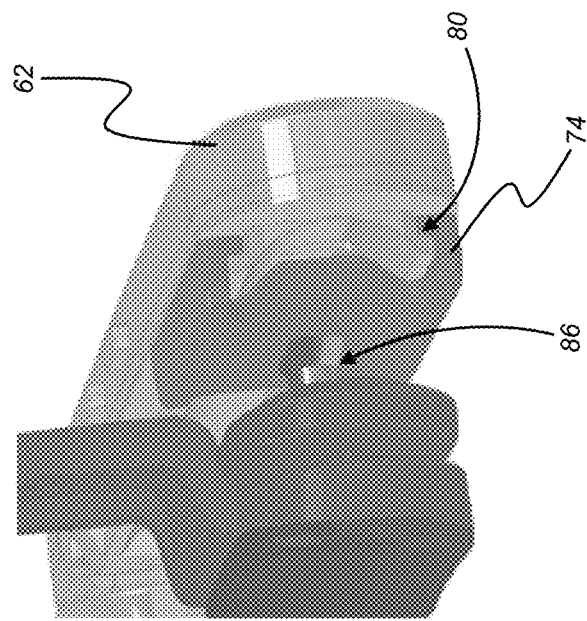
Figure 5A:
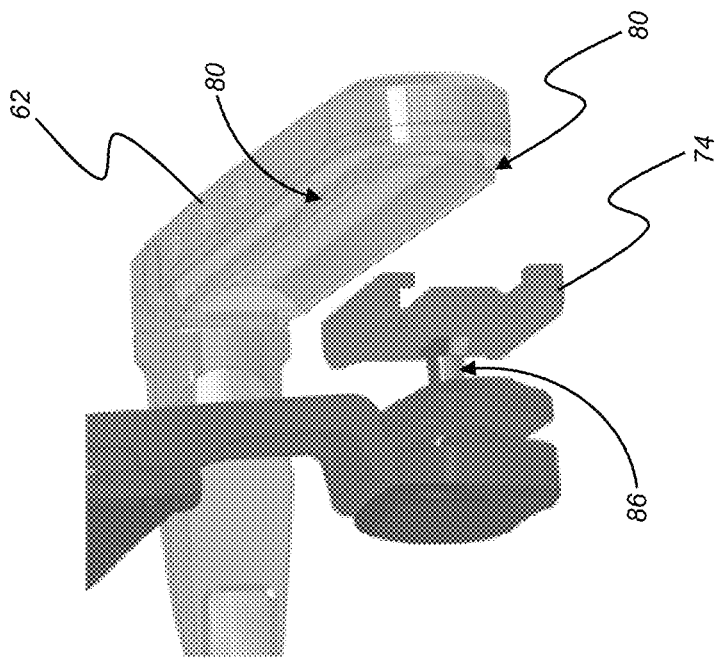

FIGS. 5A and 5B are close-up perspective views showing, from a rear perspective view, how the clamp can be coupled to the display module.

Figure 6B:
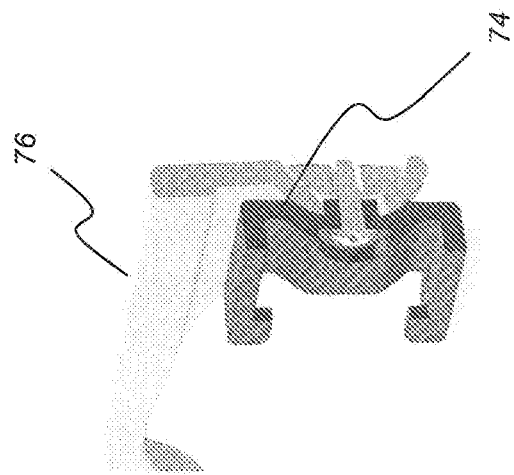
Figure 6A:
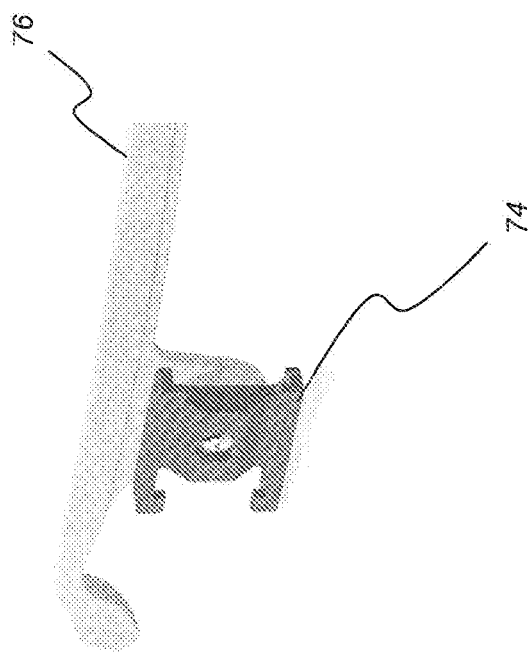

FIGS. 6A and 6B are close-up perspective views showing an alternate arrangement for a clamp in a configuration using an eyeglass frame.

Figure 7:
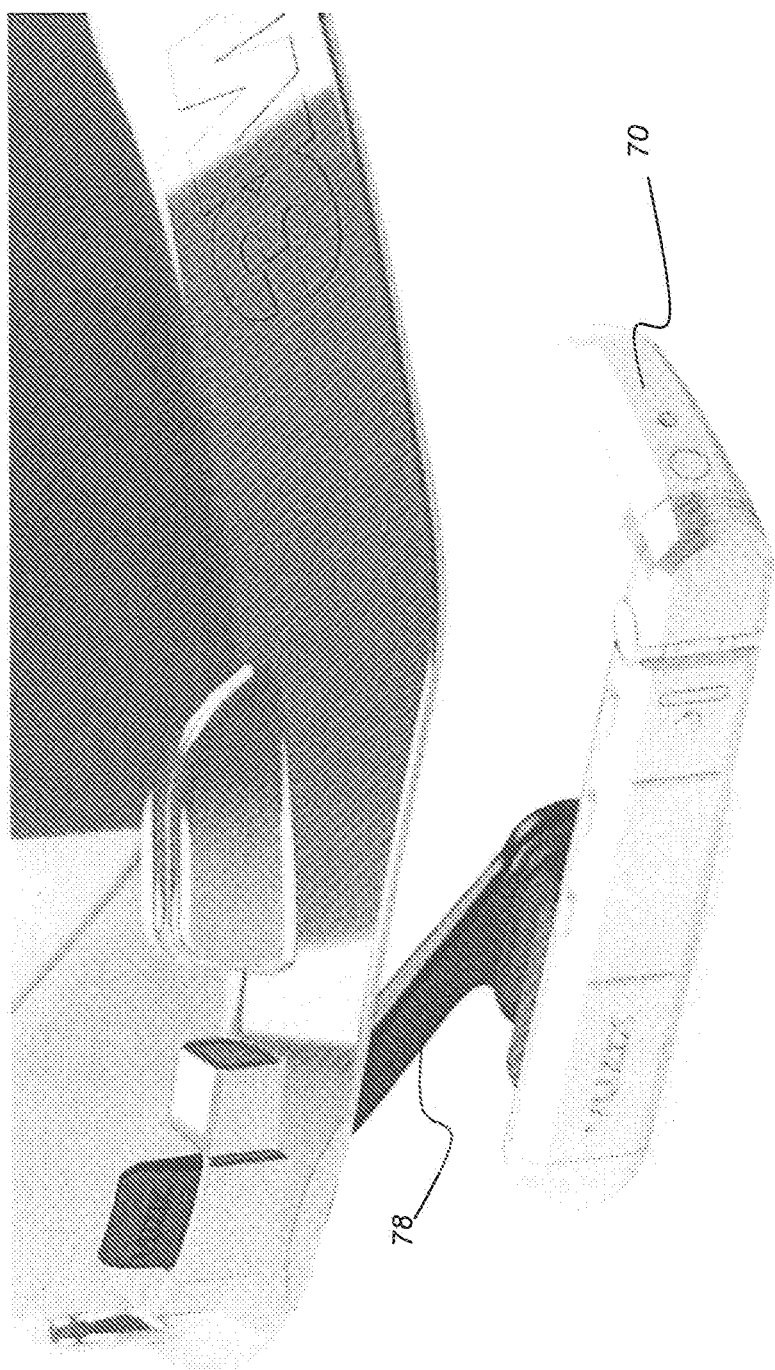

FIG. 7 is a close-up perspective view of an alternate embodiment that attaches the imaging apparatus to a helmet.

FIG. 8 is an alternate embodiment showing a waveguide based HMD.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Where they are used herein, the terms "first", "second", and so on, do not necessarily denote any ordinal, sequential, or priority relation, but are simply used to more clearly distinguish one element or set of elements from another, unless specified otherwise. The terms "top" and "bottom" do not necessarily designate spatial position but provide relative information about a structure, such as to distinguish opposing surfaces of a planar (flat) waveguide.

In the context of the present disclosure, the terms "viewer", "operator", "observer", and "user" are considered to be equivalent and refer to the person who wears the HMD viewing device.

As used herein, the term "energizable" relates to a device or set of components that perform an indicated function upon receiving power and, optionally, upon receiving an enabling signal.

The term "actuable" has its conventional meaning, relating to a device or component that is capable of effecting an action in response to a stimulus, such as in response to an electrical signal, for example.

The term "set", as used herein, refers to a non-empty set, as the concept of a collection of elements or members of a set is widely understood in elementary mathematics. The term "subset", unless otherwise explicitly stated, is used herein to refer to a non-empty proper subset, that is, to a subset of the larger set, having one or more members. For a set S, a subset may comprise the complete set S. A "proper subset" of set S, however, is strictly contained in set S and excludes at least one member of set S.

In the context of the present disclosure, the term "oblique" means at an angle that is not an integer multiple of 90 degrees. Two lines, linear structures, or planes, for example, are considered to be oblique with respect to each other if they diverge from or converge toward each other at an angle that is at least about 5 degrees or more away from parallel, or at least about 5 degrees or more away from orthogonal.

In the context of the present disclosure, the terms "wavelength band" and "wavelength range" are equivalent and have their standard connotation as used by those skilled in the art of color imaging and refer to a range of light wavelengths that are used to form one or more colors in polychromatic images. Different wavelength bands are directed through different color channels, such as to provide red, green, and blue primary colors in conventional color imaging applications.

As an alternative to real image projection, an optical system can produce a virtual image display. In contrast to methods for forming a real image, a virtual image is not formed on a display surface. That is, if a display surface were positioned at the perceived location of a virtual image, no image would be formed on that surface. A virtual image display has a number of inherent advantages for an augmented reality display. For example, the apparent size of a virtual image is not limited by the size or location of a display surface. Additionally, the source object for a virtual image may be small; a magnifying glass, as a simple example, provides a virtual image of its object. In comparison with systems that project a real image, a more realistic viewing experience can be provided by forming a virtual image that appears to be some distance away. Providing a virtual image also obviates any need to compensate for screen artifacts, as may be necessary when projecting a real image.

In the context of the present disclosure, the term "coupled" is intended to indicate a physical association, connection, relation, or linking, between two or more components, such that the disposition of one component affects the spatial disposition of a component to which it is coupled. For mechanical coupling, two components need not be in direct contact, but can be linked through one or more intermediary components. A component for optical coupling allows light energy to be input to, or output from, an optical apparatus. The terms "beam expander" and "pupil expander" are considered to be synonymous, used interchangeably herein.

Figure 1A:
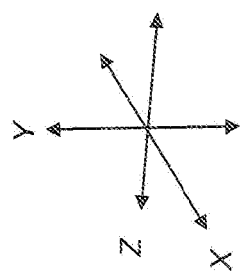
FIG. 1A is a perspective view that shows an adjustable imaging apparatus that allows viewer adjustment of the virtual image position along all 3 orthogonal axes and rotation about the 3 orthogonal axes.
Figure 1A:
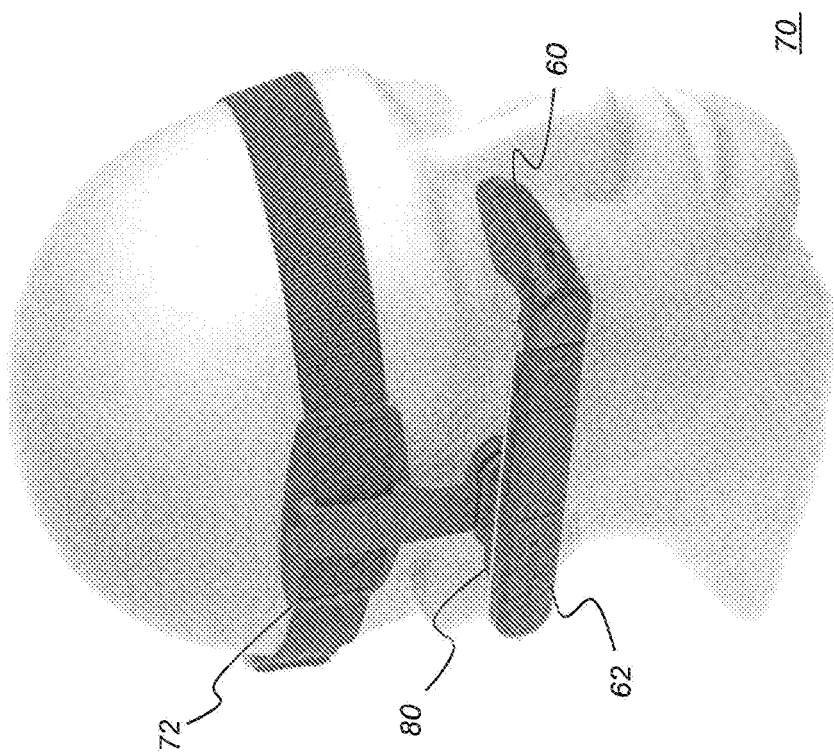
Figure 1B:
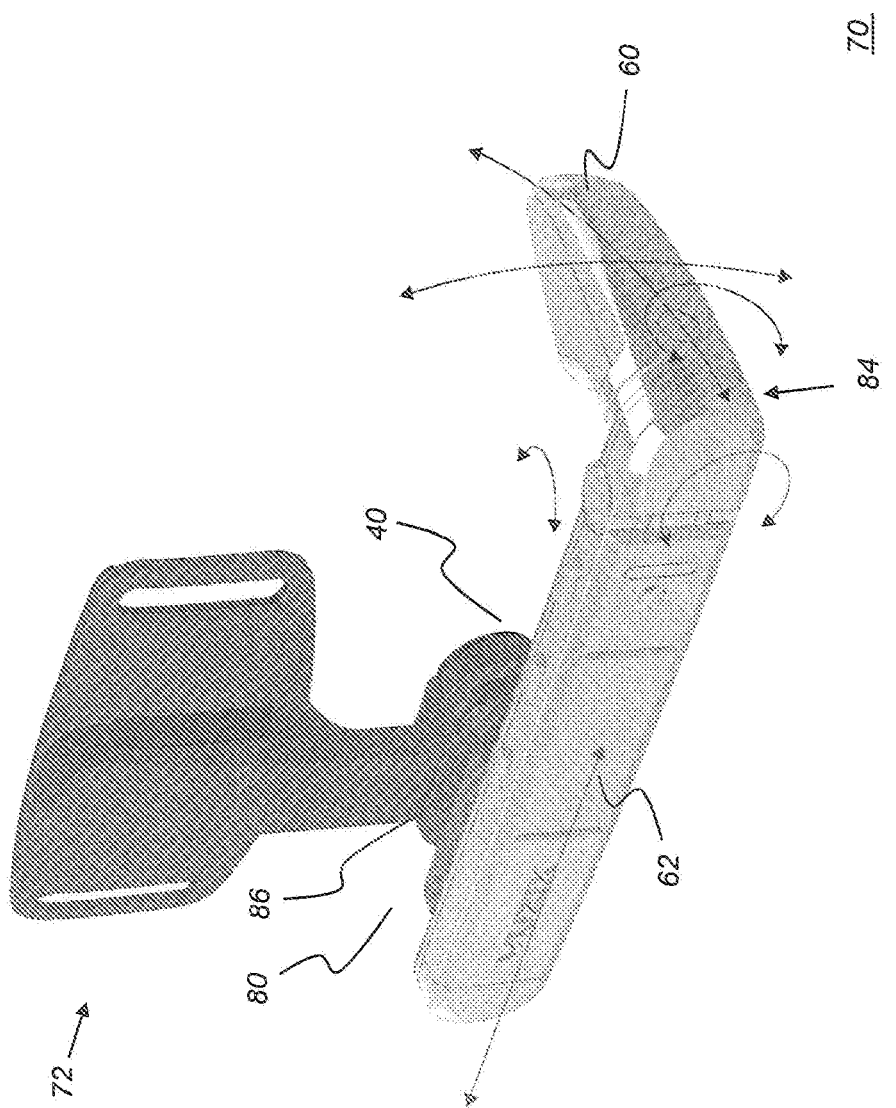
FIG. 1B is a perspective view that shows a portion of an adjustable imaging apparatus that supports the imaging display in movable configuration.

The perspective views of FIGS. 1A and 1B show an adjustable imaging apparatus 70 that allows viewer adjustment of the position of a displayed image with respect to all three translational axes and all three rotational axes. A portion of a head mount 72 is shown in FIG. 1B, with various features that are used to fit head mount 72 against the head of the viewer and allow the adjustment of the position of an image display 60 relative to the eye of a viewer. Display 60 is provided at the end of a display module 62. A slide 80, coupled to mount 72 by a ball joint 86, allows translation of display module 62 along an axis extending forward of the viewer. Optics and components of projector 40 are fitted within the display module 62. A display mount 84 then provides rotation about a number of axes as indicated.

FIGS. 2A, 2B, 2C, and 2D are schematic views that show how imaging apparatus 70 can be adjusted for various positions of display 60, relative to mutually orthogonal X, Y, and Z coordinate axes, and show corresponding axial rotations. A ball joint 86, shown in more detail subsequently, allows pitch adjustment as well as elevation adjustment and horizontal displacement for variable positioning of imaging light guide mount 84 to suit the head size of the viewer, with translational motion along the X axis and Y axis. Z axis translation of display module 62, in a forward direction with respect to the viewer, is provided by slide 80, as noted previously. Head mount 72 can be positioned along the head of the viewer using conventional methods, such as a strap arrangement or can be mounted in a helmet, as part of a frame, or as part of other headgear. A vertical hinge 88 allows rotation about vertical axis Y, which is substantially orthogonal to the forward direction defined by slide 80. A horizontal hinge 82 allows rotation about horizontal axis X, which is substantially orthogonal to vertical axis Y.

For roll adjustment of the display 60 about the X axis, FIG. 2B shows rotation using horizontal hinge 82. Rotation about horizontal hinge 82 shifts the relative position of a virtual image in the vertical direction. Where a real image is formed, horizontal hinge 82 allows movement of the real image in the roll direction, as shown in FIG. 2A.

For yaw adjustment, FIG. 2C shows rotation about the Y axis using vertical hinge 88. Movement is thus about an axis that is substantially orthogonal to the motion about the X axis. Rotation about vertical hinge 88 shifts the relative position of a virtual image in the horizontal direction.

FIG. 2D shows an elevation adjustment for display mount 84 by pivoting from ball joint 86.

It should be noted that the adjustments described with respect to FIGS. 2A-2D, and related adjustments, change the relative position of a real image formed on display 60 or, alternately, of a virtual image that appears in the viewer eye box.

FIG. 3 is a close-up perspective view that shows components of display mount 84 according to an embodiment.

FIG. 4A is a perspective view showing a portion of head mount 72 for an imaging apparatus 70 according to an embodiment. A clamp 74 is provided as a guide for holding the display module 62 (not shown in FIG. 4A for better visibility of the clamp 74). Clamp 74 is coupled to head mount 72 by ball joint 86. Clamp 74 allows the display module 62 to be separable from the head mount 72 arrangement.

FIG. 4B is a close-up perspective view showing clamp 74 and a cross-section of ball joint 86.

FIGS. 5A and 5B show, from a rear perspective view, how clamp 74 can be coupled to display module 62.

FIGS. 6A and 6B are close-up perspective views showing an alternate arrangement for clamp 74 in a configuration using eyeglass frame 76.

FIG. 7 is a close-up perspective view of an alternate embodiment with a bracket 78 that attaches imaging apparatus 70 to a helmet.

FIG. 8 is an alternate embodiment that shows an imaging apparatus 70 that uses an optical waveguide 22 for forming a virtual image from a projector 40. The waveguide is hinged relative to the optics providing side to side adjustment of the virtual image. The hinge allowing vertical movement is positioned closer to the ball joint to allow for movement of the input projector.

The invention has been described in detail with particular reference to presently preferred embodiments, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. An adjustable imaging apparatus, comprising:
   a display module having an inner surface and an outer surface;
   a support operable to mount the display module adjacent to a head of a viewer;
   a ball joint at least partially located within the support;
   a clamp coupled with the ball joint, wherein the clamp extends from the support via the ball joint and the clamp is operable to pivot relative to the support via the ball joint;
   a slide coupled with the inner surface of the display module, wherein the slide is translatable within the clamp in a first direction; and
   a display coupled with the display module, wherein the display is rotatable in a first arc about a vertical axis, wherein the vertical axis extends in a second direction that is orthogonal to the first direction, and wherein a first hinge is operable to enable rotation of the display in the first arc, wherein the first hinge is positioned between the ball joint and the display along the first direction,
   wherein the display is rotatable in a second arc about a horizontal axis that is substantially orthogonal to the vertical axis and the first direction, wherein a second hinge is operable to enable rotation of the display in the second arc, whereby a position of an image formed by the display is operable to move in two dimensions, and
   wherein the slide is separable from the clamp via translation of the display module in the first direction.

2. The apparatus of claim 1 wherein the second hinge is positioned along a longitudinal axis of the display.

3. The apparatus of claim 1 wherein the support is coupled to a headband.

4. The apparatus of claim 1 wherein the support is coupled to an eyeglass frame.

5. The apparatus of claim 1 wherein the display module is located in a position outward of the clamp.

6. The apparatus of claim 1 further comprising a projector located within the display module.

7. The apparatus of claim 1 wherein the support is coupled to a helmet.

8. The apparatus of claim 1 wherein a spherical member of the ball joint is at least partially located within the support.

9. An adjustable imaging apparatus, comprising:
   a display module,
   a projector located within the display module, wherein the projector is operable to emit image-bearing light;
   a support operable to mount the display module adjacent to a head of a viewer;
   a ball joint having a spherical member at least partially located within the support, wherein the ball joint at least partially extends from the support;
   a clamp coupled with the ball joint, wherein the clamp is operable to pivot relative to the support via the ball joint;
   a slide coupled with the display module, wherein the slide is translatable within the clamp in a first direction; and
   a display operable to form a virtual image within an eyebox via the image-bearing light from the projector, the display coupled with the display module, wherein the display is rotatable relative to the projector in a first arc about a vertical axis that extends in a second direction that is orthogonal to the first direction, and wherein the display is rotatable in a second arc about a horizontal axis that is substantially orthogonal to the vertical axis and the first direction;
   a first hinge operable to enable rotation of the display in the first arc; and
   a second hinge operable to enable rotation of the display in the second arc;
   wherein the second hinge is positioned between the ball joint and the display along the first direction, and the first hinge is located between the display and the second hinge.

10. The apparatus of claim 9 wherein the first hinge is located in line with the display along the horizontal axis.

11. The apparatus of claim 9 wherein the display comprises a waveguide operable to form the virtual image.

12. An adjustable imaging apparatus, comprising:
   a display module having an inner surface and an outer surface;
   a support operable to mount the display module adjacent to a head of a viewer;
   a ball joint having a spherical member at least partially located within the support, wherein the ball joint at least partially extends from the support;
   a clamp coupled with the ball joint, wherein the clamp is operable to pivot relative to the support via the ball joint;
   a slide coupled with the inner surface of the display module, wherein the slide is translatable within the clamp in a first direction; and
   a display coupled with the display module, wherein the display is rotatable in a first arc about a vertical axis that extends in a second direction that is orthogonal to the first direction, and wherein the display is rotatable in a second arc about a horizontal axis that is substantially orthogonal to the vertical axis and the first direction;
a first hinge operable to enable rotation of the display in the first arc; and
a second hinge operable to enable rotation of the display in the second arc,
wherein the second hinge is positioned between the ball joint and the display along the first direction, and the first hinge is located between the display and the second hinge, and
wherein the slide is separable from the clamp via translation of the display module in the first direction.

13. The apparatus of claim 12 wherein the first hinge is located in line with the display along the horizontal axis.

14. The apparatus of claim 12 wherein the display comprises a waveguide operable to form a virtual image.

* * * * *